(12) United States Patent
Boutillon et al.

(10) Patent No.: US 8,547,191 B2
(45) Date of Patent: Oct. 1, 2013

(54) DAMPING DEVICE CAPABLE OF PROVIDING INCREASED STIFFNESS

(75) Inventors: Xavier Boutillon, Antony (FR); Moustapha Hafez, Arcueil (FR); Jose Lozada, Massay (FR)

(73) Assignees: Commissariat a l'Energie Atomique et aux Energies Alternatives, Paris (FR); Centre National de la Recherche Scientifique, Paris (FR)

( * ) Notice: Subject to any disclaimer, the term of this patent is extended or adjusted under 35 U.S.C. 154(b) by 776 days.

(21) Appl. No.: 12/681,651

(22) PCT Filed: Oct. 13, 2008

(86) PCT No.: PCT/EP2008/063697
§ 371 (c)(1), (2), (4) Date: Jun. 17, 2010

(87) PCT Pub. No.: WO2009/050135
PCT Pub. Date: Apr. 23, 2009

(65) Prior Publication Data
US 2010/0283724 A1 Nov. 11, 2010

(30) Foreign Application Priority Data
Oct. 15, 2007 (FR) .................................. 07 58326

(51) Int. Cl.
*H01F 7/00* (2006.01)
*H01F 1/00* (2006.01)
*F16F 15/03* (2006.01)
*F16F 9/53* (2006.01)

(52) U.S. Cl.
USPC ................. 335/219; 335/29; 335/47; 335/49; 192/21.5; 188/267; 188/267.1; 188/267.2; 188/140.14; 188/140.15

(58) Field of Classification Search
USPC ..................... 335/29, 47, 49, 219; 192/21.5; 188/267–267.2, 140.14, 140.15
See application file for complete search history.

(56) References Cited

U.S. PATENT DOCUMENTS

| 3,488,531 | A | * | 1/1970 | Rosensweig | .................... 310/10 |
| 5,038,894 | A | * | 8/1991 | Watanabe | ..................... 187/272 |
| 5,358,084 | A | * | 10/1994 | Schramm | ..................... 192/21.5 |
| 5,845,753 | A |   | 12/1998 | Bansbach | |
| 6,427,813 | B1 |   | 8/2002 | Carlson | |

(Continued)

FOREIGN PATENT DOCUMENTS

| JP | 63-231028 A | 9/1988 |
| JP | 06092598 A | 5/1994 |

(Continued)

OTHER PUBLICATIONS

Office Action from Japanese National Phase Application No. 2010-529347; Dated Feb. 12, 2013.

(Continued)

*Primary Examiner* — Mohamad Musleh
(74) *Attorney, Agent, or Firm* — Pearne & Gordon LLP

(57) ABSTRACT

Damping device to impose a reaction to the displacement of a manual operating device (28), said device comprising at least one chamber containing the magneto-rheological fluid, one or two means of generating a variable magnetic field (6.1, 6.2) in the magneto-rheological fluid so as to modify its apparent viscosity, one element (4) free to move in translation capable of shearing the magneto-rheological fluid and designed to be mechanically connected to the manual operating device (28), said mobile element (4) comprising a blade with a longitudinal axis (Y) comprising holes and/or recesses and/or projections.

16 Claims, 7 Drawing Sheets

(56) References Cited

U.S. PATENT DOCUMENTS

| | | | |
|---|---|---|---|
| 6,463,736 B1 * | 10/2002 | Pohl et al. | 60/326 |
| 6,585,616 B1 | 7/2003 | Robinson | |
| 6,732,529 B2 * | 5/2004 | Anderson | 60/772 |
| 7,133,166 B2 | 11/2006 | Ferlitsch et al. | |
| 2001/0041637 A1 | 11/2001 | Leeper | |
| 2004/0084887 A1 | 5/2004 | Loh et al. | |
| 2004/0195061 A1 | 10/2004 | Kelso et al. | |
| 2007/0013655 A1 | 1/2007 | Rosenberg et al. | |
| 2009/0050425 A1 * | 2/2009 | Murakami et al. | 188/267.2 |
| 2010/0031803 A1 * | 2/2010 | Lozada et al. | 84/439 |

FOREIGN PATENT DOCUMENTS

| | | |
|---|---|---|
| JP | 2003056639 A | 2/2003 |
| WO | 96/33356 A1 | 10/1996 |
| WO | 20061051301 A1 | 5/2006 |
| WO | WO 2007144349 A1 * | 12/2007 |

OTHER PUBLICATIONS

Adams et al; "Stable Haptic Interaction with Virtual Environments", IEEE Transactions on Robotics and Automation, vol. 15, No. 3, Jun. 1999, pp. 465-474.

Ahmadian; "On the Application of Magneto-Rheological Fluid Technology for Improving Rail Vehicle Dynamics", Proceedings of ASME IMECE 2002, 2002 International Mechanical Engineers Conference, Nov. 17-22, IMECE2002-33250, pp. 1-6.

Conti et al; "A Hybrid Actuation Approach for Haptic Devices", Proceedings of World Haptics Conference, 2007, pp. 1-6.

Colgate et al; "Factors Affecting the Z-Width of a Haptic Display", Proceedings of the IEEE 1994 International Conference on Robotics & Automation, pp. 3205-3210, May 1994.

Jolly et al; "Properties and Application of Commercial Magnetorheological Fluids", 5th Annual Symposium on Smart Structures and Materials, 1998, pp. 1-18.

Magnac et al; "Characterisation of Magneto-Rheological Fluids for Actuators Applications", Proceedings of 10th International Conference on New Actuators, Jun. 14-16, 2006, pp. 1-4.

French Preliminary Search Report for FR 07 58326 dated May 26, 2008.

International Search Report for PCT/EP2008/063697 dated Jan. 9, 2009.

* cited by examiner

DAMPING DEVICE CAPABLE OF PROVIDING INCREASED STIFFNESS

TECHNICAL FIELD AND PRIOR ART

This invention relates to a magneto-rheological fluid damper, and more generally to a device capable of generating a resistance to a movement by modifying the apparent viscosity of a magneto-rheological fluid by modulation of a magnetic field, this system possibly being used in touch sensitive or haptic simulation systems to oppose the advance of manual operating device, a reaction reflecting the execution of the command.

Man-machine interfaces used for example in virtual reality must have two opposing characteristics, firstly they must enable movements at no load as easily as possible to simulate free displacement, and secondly they must be capable of having a high stiffness, for example to simulate a solid or a virtual wall.

For example, it is known that classical electromagnetic motors of a known type can be used to produce resistive forces. The stiffness of such systems that can generate energy (fully active systems) is always a factor that limits stability.

A semi-active damper is a system that can only absorb energy and for which the damping coefficient can be controlled as a function of applied loads, through a control system. Some interfaces use rotating semi-active brakes which have the disadvantage of being large. Other interfaces use semi-active dampers, but the force of these systems at no load is often too high.

Document U.S. 2007/0013655 discloses a device reproducing the reaction perceived by a fisherman manipulating his reel in a fishing simulation game, or a cyclist pressing on the pedals of an apartment bicycle.

This device uses a plate free to move in translation in an airgap delimited by two legs of a U on which sponges soaked with magneto-rheological fluid are fitted.

During its translational displacement, the mobile plate rubs on the sponges. By modifying the magnetic field in the airgap, the apparent viscosity of the magneto-rheological fluid contained in the sponges varies, which modifies the resistance of the plate to forwards motion.

This system has a limited life due to continuous friction of the plate on the sponges. Furthermore, this construction can only generate limited damping, particularly due to the limited action of the magneto-rheological fluid on the plate, since the contact surface is small. Therefore, in many situations this system cannot be used to make an efficient damper while remaining acceptable in size. If a large amount of damping is required, a large plate will be required so that shear forces generated in the magneto-rheological fluid will be sufficient to provoke the required damping. This would consequently require a large damping device that would have limited use.

Document U.S. 2004/0084887 discloses a device designed to avoid vibrations in an automobile vehicle steering system. This device is inserted into the steering column and it comprises a housing filled with magneto-rheological fluid, a rotor fixed in movement to the upper part of the steering shaft and electrical coils to generate a magnetic field within the housing. The rotor is formed from a disk with an axis coincident with the steering shaft axis, this disk also comprising axial drillings and teeth at its periphery. The teeth and drillings provoke normal and shear forces in the magneto-rheological fluid, which can reduce vibrations in rotation and in the axial direction. This device has the disadvantage of being large.

Consequently, one of the purposes of this invention is to offer a damping device with magneto-rheological fluid capable of providing large damping forces, while remaining compact and having a longer life.

PRESENTATION OF THE INVENTION

The purpose mentioned above is achieved by using a device comprising a chamber containing a magneto-rheological fluid and at least one blade capable of moving in translation along its axis in magneto-rheological fluid, the larger faces of this blade comprising ribs and/or through drillings, in order to increase the resistance of the magneto-rheological fluid to displacement when its viscosity is increased by the application of a magnetic field.

In other words, the blade is not smooth at the scale of the device, it comprises either projecting or recessed relief on one or both of its two larger faces. Thus when a magnetic field is applied, the magnetic particle chains contained in the magneto-rheological fluid that form during application of a magnetic field arrive at the relief and form obstacles to their displacement, and/or the blade comprises drillings, and in this case particle chains form in the drillings through the blade and also form obstacles for displacement of the blade.

Thus, the device offers more damping in a smaller size.

This invention can generate high resistance while keeping forces at no load tolerable. Firstly, the use of a linear brake based on magneto-rheological fluid can increase the resisting force. Secondly, since the brake can only dissipate mechanical energy, it has stabilising action on the system.

The magneto-rheological fluid is used in shear with thin blades, which can reduce the size of the system while keeping a high resistance.

The main subject-matter of this invention is then a damping device to oppose a reaction to the displacement of a manual operating device, said damping device comprising at least one chamber containing the magneto-rheological fluid, at least one means of generating a variable magnetic field in the magneto-rheological fluid so as to modify its apparent viscosity, at least one element free to move in translation capable of shearing the magneto-rheological fluid and designed to be mechanically connected to the manual operating device, said element comprising at least one blade with a longitudinal axis comprising holes and/or recesses and/or projections.

The blade may be made of a non-magnetic material, in which case it may comprise parallel slits and/or drillings.

In one variant embodiment, the blade comprises a core made of a magnetic material in which holes and/or recesses and/or projections are formed, and strips made of a non-magnetic material on its side ends and on its two faces.

In another variant embodiment, the blade comprises a solid core and two plates of non-magnetic material covering each face of the solid core, slits being formed in the two plates. With this variant embodiment, a scraping phenomenon occurs.

It would also be possible to have a mobile element comprising several parallel blades, which would result in even higher damping forces for an equivalent size.

In one embodiment, the device comprises a magnetic field generation means, in which the airgap forms said chamber full of magneto-rheological fluid, said airgap comprising an inlet at each of its longitudinal ends through which the blade passes, the blade moving along its longitudinal axis.

The magnetic field generation means may for example comprise two E-shaped cores facing each other such that the ends of the central legs of the E-shaped poles are facing each other, thus delimiting the airgap and coils mounted on the central legs.

For example, this device may comprise an operating device at each of its ends and two flexible membranes, each fixed in a sealed manner onto the magnetic field generation means around the entrances of the airgap and the operating device. The use of a flexible membrane to make the seal avoids the development of friction forces that could reduce the damping quality.

In another embodiment, the damping device comprises two magnetic field generation means each defining an airgap forming two chambers full of magneto-rheological fluid, said airgaps being provided with a single entrance at one longitudinal end, the magnetic field generation means being arranged at a distance from each other and such that the entrances to the airgaps are facing each other and that a longitudinal end of the blade fits into each of the airgaps, the blade moving along its axis.

The use of two damping means, each acting on one end of the blade, with the blade moving along its longitudinal axis, makes it possible to exert balanced forces on the blade and on constant surface areas. In fact, the surface actually inside the airgap and shearing the magneto-rheological fluid is always the same.

The device may comprise a flexible membrane surrounding the entrances and the operating device making a sealed assembly, the manual operating device being fixed approximately at the centre of the blade orthogonal to its longitudinal axis.

Advantageously, the operating device is made in two parts, one part fixed on the blade and another part fixed on the part fixed on the blade, the membrane being trapped between the two parts. The sealed attachment is then very easy to make and is very efficient.

It could be envisaged that the airgap(s) is (are) divided by means of magnetic plates such that there is one airgap for each blade, one blade being used in each airgap.

Another subject-matter of this invention is a damping system comprising a damping device according to this invention, an electrical power supply source for the magnetic field generation means, at least one sensor of a kinematic and/or dynamic magnitude representing the movement of this element or the operating device and a control device, said sensor being connected to the control device itself connected to the magnetic field generation means, the assembly being such that the apparent viscosity of the magneto-rheological fluid varies during displacement of the manual operating device. The at least one sensor may be an acceleration, velocity and/or displacement sensor.

Another subject-matter of this invention is a haptic interface type simulation system comprising a system according to this invention.

BRIEF DESCRIPTION OF THE DRAWINGS

This invention will be better understood after reading the following description and the appended drawings in which.

DETAILED PRESENTATION OF PARTICULAR EMBODIMENTS

In this application, a manual operating device is not restricted to a device moved by means of a hand, but it includes any device that can be moved by another member, for example a foot.

Figure 1:
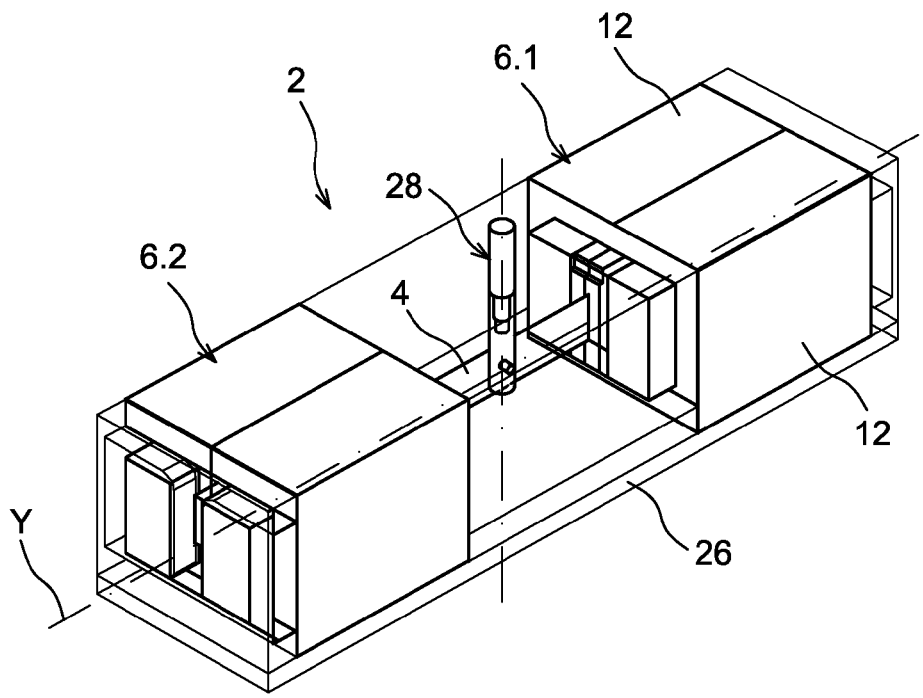
FIG. 1 is a perspective view of an embodiment of a damping device according to this invention, the flexible membrane not being shown.

FIG. 1 shows an embodiment of a damping device 2 with magneto-rheological fluid according to this invention comprising an element free to move formed from a single blade 4 made of a non-magnetic material, for example made of brass, capable of moving in a median plane P of the blade parallel to its two larger faces.

For the purposes of this application, "blade" means an element with a length and a width that are large relative to its thickness, and that has some flexibility in the direction normal to the median plane P.

In the example shown, the blade 4 can move along a Y axis along the larger dimension of the blade 4.

The blade 4 comprises a first end 4.1 and a second end 4.2 along the Y axis, each of these ends being arranged in an airgap of the magnetic field generation means 6.1, 6.2.

According to this invention, the blade comprises projecting and/or recessed relief and/or drillings, as we will describe in more detail in the remainder of the description.

We will now describe the magnetic field generation means 6.1; the means 6.2 is similar and therefore will not be described in detail.

Figure 5A:
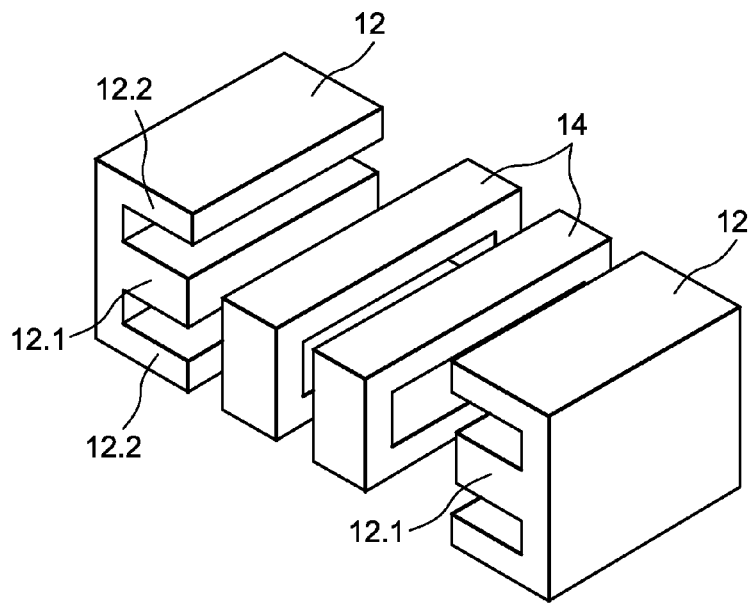
FIGS. 5A and 5B are partial perspective views of a magnetic field generation means in the damping device in FIG. 1.
Figure 5B:
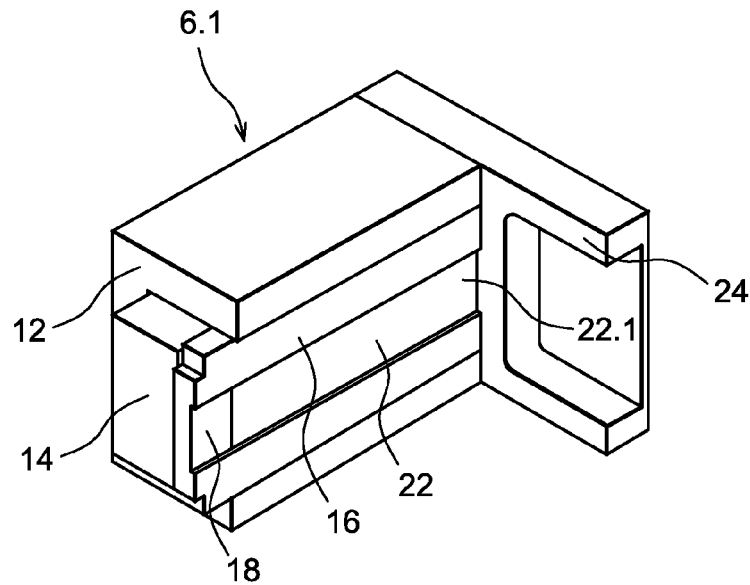
Figure 6:
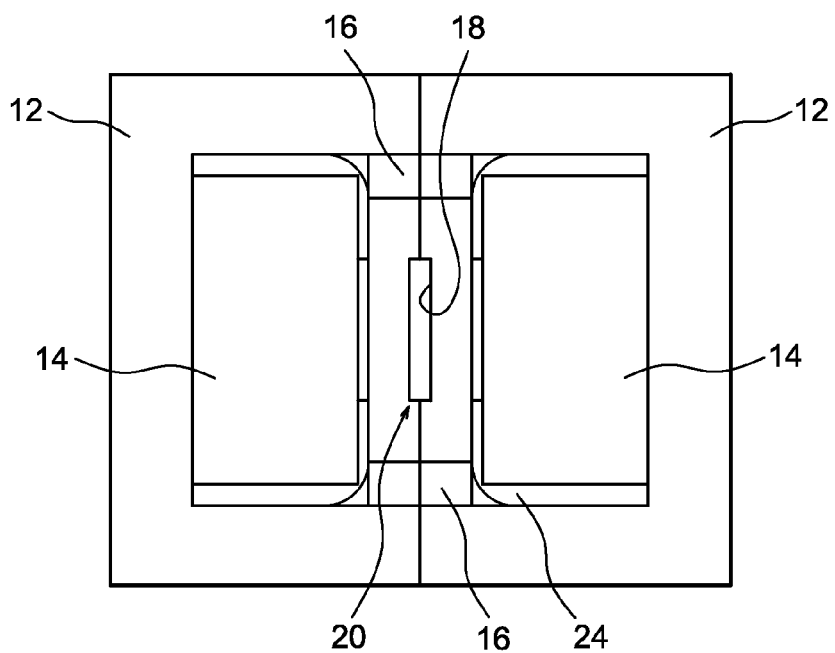
FIG. 6 is a side view of the magnetic field generation means in FIGS. 5A and 5B.

The magnetic field generation means 6.1, shown particularly in FIGS. 5A, 5B and 6, delimits an airgap containing the magneto-rheological fluid in which the blade 4 can move.

A magneto-rheological fluid is a suspension of micrometric ferromagnetic particles in a carrier fluid, for example mineral or synthetic oil or water.

In the particular example shown, the magnetic field generation means 6.1 comprises two poles 12 made of a ferromagnetic material, for example soft iron, ferrite or an alloy with high magnetic permeability, in the form of an E, and two coils 14. Each coil 14 is arranged around the central bar 12.1 of the E. The two poles 12 are arranged such that the bars are facing each other. The length of the central bars is less than the length of the end bars 12.2, such that the central bars delimit the airgap by their facing ends.

For example, thickness of this airgap may be 1 mm.

The damping device 2 also comprises a sealing system at the airgap, to contain the magneto-rheological fluid.

In the example shown, the sealing system comprises two U-shaped parts 16 each threaded onto a central bar 12.1 of the U along the Y axis, these parts 16 for example being glued or adjusted in a tight manner, to achieve lateral sealing of the device at the magnetic field generation means 6.1.

It could also be envisaged to use only one U-shaped part 16 overlapping on the two central bars 12.1, the part comprising a passage for the blade.

Each U-shaped part 16 comprises a groove 18 at the bottom of the U and extends as far as the recessed part of the U, this groove having a width equal to approximately the width of the central bar of the pole and a depth equal to half the depth of the airgap.

The U-shaped parts 16 are arranged such that the two grooves 18 are facing each other and delimit a rectangular section channel 20 along the Y axis towards a chamber 22 delimited by the recessed central parts of the U. FIG. 6 shows one end of this passage 20.

The blade passes through the channel 20.

Obviously, any sealing system capable of guiding the blade could be used for this invention.

This passage 20 allows the blade 4 to pass through as we will describe later.

The sealing system also comprises a plate 24 closing off one end 22.1 of the chamber 22 in a sealed manner, opposite the passage 20 along the Y axis. For example, the plate may be glued.

In the example shown, the plate 24 comprises two recesses and a central rib closing off the end 22.1 of the chamber 22. The two recesses can form the place necessary for the ends of the coils that surround the central bars of the E of the magnetic core. The central rib comes into contact with the U-shaped parts 16, thus providing the seal without colliding with the coils.

The U-shaped parts 16 and the plates 24 are made of a non-magnetic material, for example Plexiglas®.

The two magnetic field generation means 6.1, 6.2 are fixed relative to each other by fixing them on a frame 26, such that the passages 20 are facing each other.

The blade is mounted in magnetic field generation means 6.1, 6.2, and in particular the blade passes through the passages 20 and the longitudinal ends of the blade are housed in the chambers 22.

The E-shaped cores could be replaced by two U-shaped parts facing each other, in which one of the legs of the U is shorter so as to form an airgap.

The damping device 2 also comprises an operating device 28, through which a force applied by an operator is transmitted to the blade and through which the blade applies a damping force perceived by the operator.

In the example shown, this device 28 is formed by a rod fixed in a central part of the blade 4 orthogonal to the Y-axis of the blade 4.

A seal is also formed between the two magnetic field generation means 6.1, 6.2 and the operating device to prevent any leak of magneto-rheological fluid.

This seal is advantageously made by an unwinding flexible membrane 30 fixed in a sealed manner to the two magnetic field generation means 6.1, 6.2 and to the operating device 28.

The material from which the membrane is made is chosen to be compatible with the magneto-rheological fluid, for example nitrile.

For example, this membrane may be tubular in shape and each of the ends is fixed around the passages 20, for example the U-shaped parts 16 and comprises an opening 32 around its periphery through which the organ 28 will pass. The membrane is fixed onto the U-shaped parts 16, for example by gluing.

To achieve this, the operating device is advantageously made of two elements 28.1, 28.2, a first element 28.1 fixed to the blade and a second element 28.2 screwed onto the first element, the contour of the opening 32 being trapped between the two parts 28.1, 28.2 of the operating device.

The flexible membrane 30 seals the device, while enabling displacement of the blade 4. This arrangement does not create any parasite friction forces and therefore disturb neither the damping intensity nor the movement at no load.

The use of two magnetic field generation means arranged symmetrically on each side of the operating device has the advantage of maintaining a constant interaction surface area between the blade and the magneto-rheological fluid during the displacement.

The use of two field generators also provides the means of distributing forces in the blade so as to reduce the risk of buckling. Buckling of a plate (or a beam) depends on the compression stress on the section and the compressed length. The use of two field generation means that when the blade moves, one side of it (relative to the position of the operating device) is under compression while the other is under tension. Therefore the global compression stress is limited, which reduces the risk of buckling.

It would be possible to provide operating device guidance means to avoid stressing the blade in torsion. However, note that in general the operating device is not directly linked to the user.

This damper is assembled as follows:

The first step is to install the two magnetic field generation means, except for one of the two parts 24. The blade and the first part of the operating device are then mounted. The next step is to mount the membrane and the second part of the operating device. The fluid system MR is filled through the opening left by the missing part 24 and the device is closed. Finally, the two magnetic generation systems are fixed on the frame.

FIGS. 2A to 4 show example embodiments of the blade according to this invention.

Figure 2A:
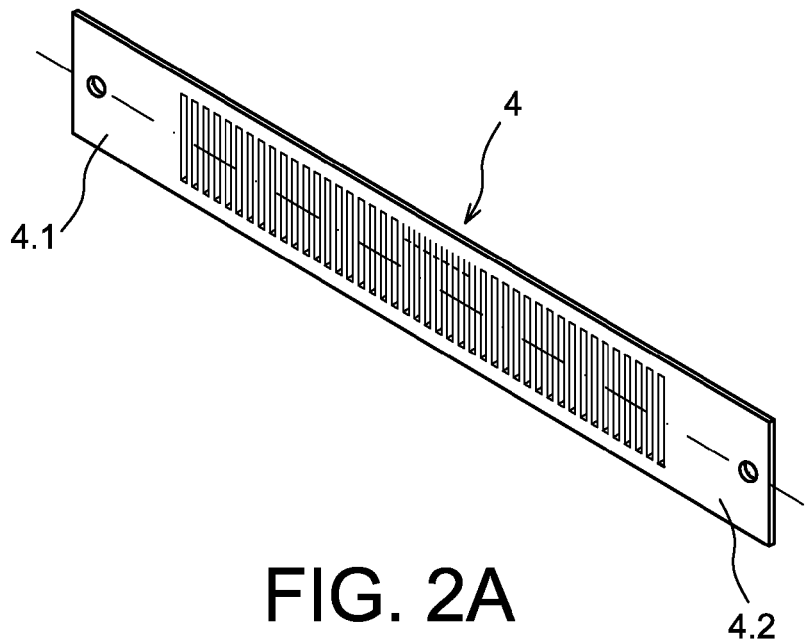
FIG. 2A is a perspective view of an example embodiment of a blade that can be used in the device partially shown in FIG. 1.

FIG. 2A shows an example embodiment, the blade made of a non-magnetic material comprising slits 8 passing through the blade from one side to the other. In the example shown, the slits 8 are orthogonal to the Y axis, but blades comprising grooves parallel to the Y axis or grooves inclined from the X and Y axes are within the scope of this invention.

Figure 2B:
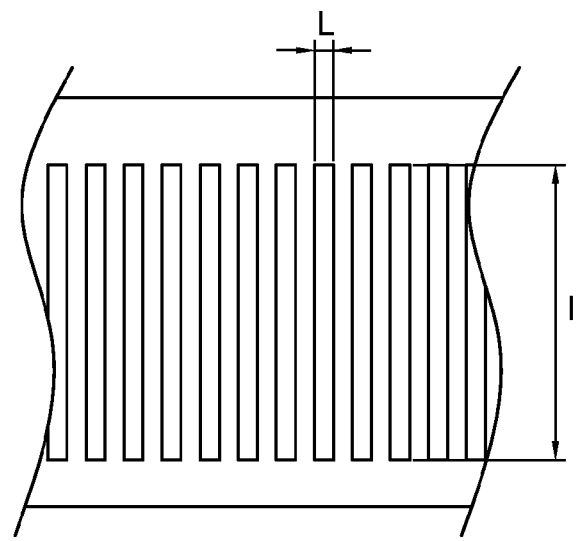
FIG. 2B is an enlarged plane view of the blade in FIG. 2A.

FIG. 2B shows the slits enlarged. For example, the slits may have a width L of 0.25 mm and a length l of 7 mm.

Advantageously, the slits are perpendicular to the direction of movement, i.e. perpendicular to the longitudinal axis of the plate in the example described above, the shear of the magneto-rheological fluid being more efficient in these cases. But blades provided with oblique slits and/or drillings with other shapes, for example circular, are within the scope of this invention.

Figure 7:
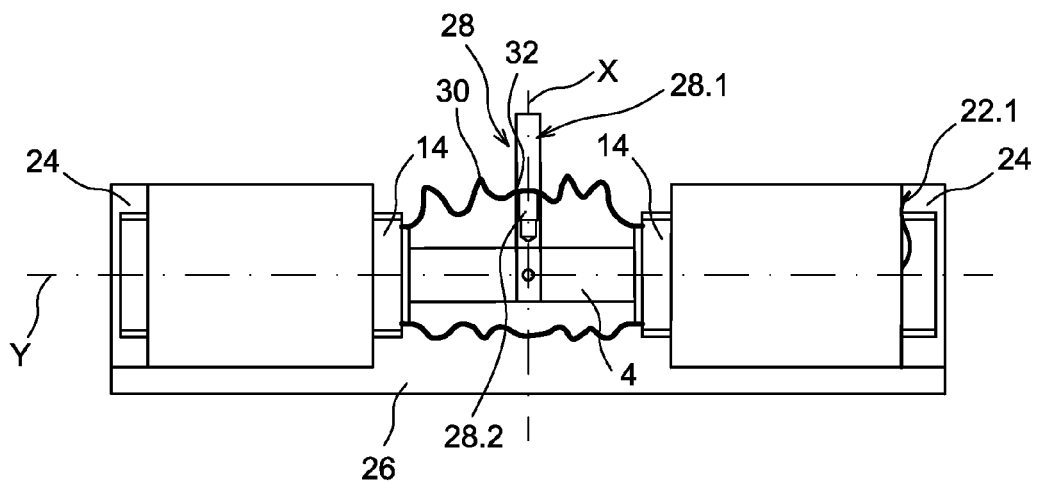
FIG. 7 is a front view of the complete device in FIG. 1.

In the example shown, the blade 4 comprises slits on its central part, however in the embodiment shown in FIG. 7, it would be possible for the slits to be present only at the ends 4.1, 4.2 of the blade, at the level of which the apparent viscosity of the magneto-rheological fluid is modified by the magnetic field generation means 6.1, 6.2.

It would also be possible for the slits to be not straight or not continuous over the entire width or length of the blade.

It would also be possible that the blade comprises holes with a circular or oblong section instead of slits, passing through the blade from one side to the other, these holes possibly in line or distributed at random on the blade. The lower limit of the diameter of the drillings is chosen as a function of the minimum particle size, the minimum size being approximately 100 μm while the maximum size of the drillings depends on the width of the plate, and is of the order of a few millimetres in the case described.

The dimension and density of the slits and/or drillings is determined to achieve a compromise between the maximum damping force and the mechanical behaviour of the blade. The blade can be weakened if there are too many slits.

The thickness of the blade 4 is less than the width of the passages 20. In the example shown, the blade 4 is not in contact with the poles when the blade is placed in the magnetic field generation means.

The non-magnetic blade may for example be made from brass, aluminium or mica.

Figure 3:
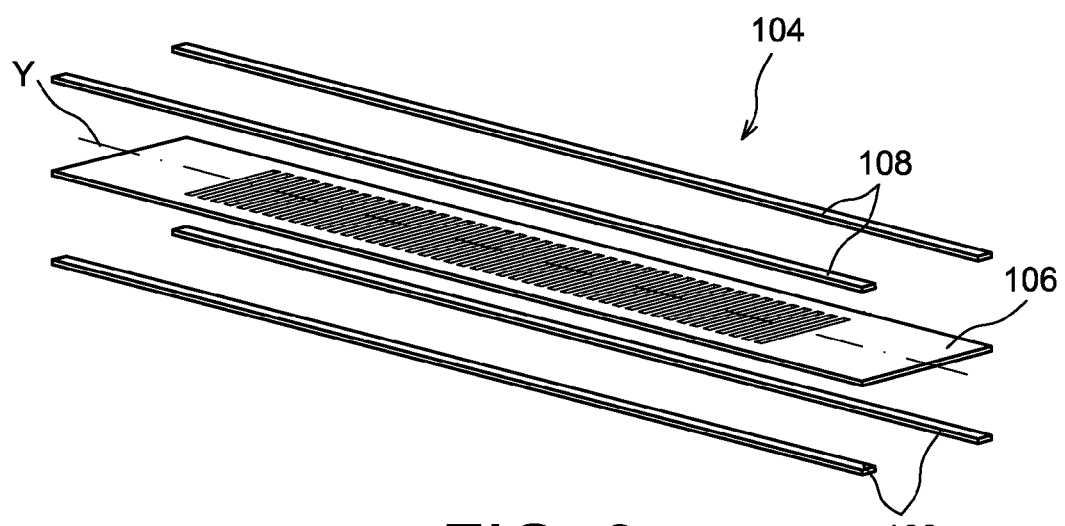
FIG. 3 is an exploded view of another example embodiment of a blade for a device according to the invention.

FIG. 3 shows another example embodiment of a blade according to this invention 104 that can be used to make a body made of magnetic material.

Blade 104 comprises a core 106 in the form of a blade provided with slits and/or ribs similar to the blade 104 made of a magnetic material shown in FIG. 2A, and rods 108 made of a non-magnetic material added onto the core 106, and bordering the larger edges of the core 106. The total thickness of the blade is approximately equal to the width of the passages 20, and it is guided by the walls of the passages during its displacement along the X axis by means of the add-on strips 108.

The core 106 may be made of soft iron, steel, ferrite or alloys with high permeability, and the strips 108 may be made of brass, aluminium, mica, or even a plastic material compatible with the MR fluid.

The strips are in contact with the poles when the blade is in position in the magnetic field generation means.

Figure 4:
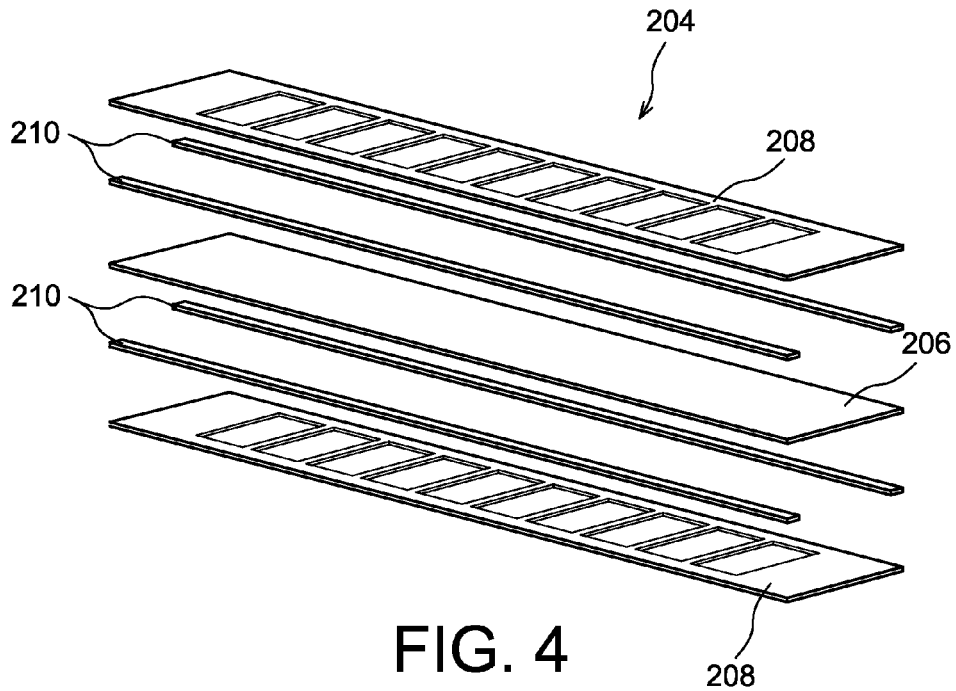
FIG. 4 is an exploded view of another example embodiment of a blade for a device according to the invention.

FIG. 4 shows another example embodiment of a blade 204 according to this invention comprising grooves.

The blade 204 comprises a core 206 made of a magnetic material, and two non-magnetic plates 208 provided with slits added onto the two faces of the core, thus forming grooves in the faces of the blade. Strips 210 are added onto the core, bordering the longest edges of the core 206. The thickness of this assembly is such that it corresponds to the width of the airgap, which guides the blade.

The strips 210 create a space between the magnetic core 206 and the non-magnetic plates 208 in which slits are formed. The magneto-rheological fluid can then circulate freely through this space when the magnetic field is null. Therefore the force at no load is reduced.

The use of such a blade causes fluid shear by the blades 208 in which slits are formed by causing a scraping phenomenon, which increases the maximum resistance that can be applied by the damping device according to this invention. The non-magnetic blades in which slits are formed are in contact with the magnetic poles. During displacement of the blade, the chains are broken at the magnetic poles where the teeth of the non-magnetic plates pass through, corresponding to the scraping phenomenon.

Furthermore, since the blades 208 are in contact with the poles, friction between the blade 204 and the poles is increased, this friction allowing the appearance of the scraping phenomenon and the use of a magnetic core, which considerably increase the maximum forces.

It could be envisaged to make the blades in a single piece instead of assembling them; in particular for the blade in FIG. 4, it could be envisaged to make the grooves by machining or etching the faces of the blades. In this case, the blade would be made entirely of a non-magnetic material.

It would also be possible to make blades with protuberances, for example ribs or bumps of any shape.

The damping device according to the invention is associated with an electronic system capable of producing the current necessary in the coils to obtain a sufficient apparent viscosity of the magneto-rheological fluid. The device can also operate in real time, and to achieve this it is associated with force and/or position and/or movement sensors.

The damping device according to the invention can be used to simulate a force at a man-machine interface, to simulate the reaction of a hydraulic braking or other type of circuit, to simulate a force in a body building apparatus, in a games joystick, in a haptic device for virtual reality or remote operation (for example a surgical operation or in a hostile environment). To achieve this, the device is integrated into a damping system comprising one or more sensors of a kinematic or dynamic magnitude representing the movement of the mobile element or the manual operating device. A single sensor might be sufficient, and a priori it could possibly be determined from a model; a second sensor might be useful to improve the precision of the simulation. The sensor(s) may be placed directly on the operating device or on the blade.

Starting from time measurements made by the sensor(s) and one or more analogue-digital converters, a control device 700 (FIG. 10) determines the intensity of the electrical current in real time, that allows the means 6.1, 6.2 to generate a magnetic field adapted to the force to be applied in reaction on the manual operating device. The magnetic field is calculated from sensor data and a mathematical model of the dynamic behaviour to be simulated that is pre-recorded in the memory of the control device.

The control device 700 comprises a real time computer 710, typically a DSP (digital signal processor) or other provided with one or several analogue-digital converters and a memory that determines the electrical current to be applied to the magnetic field generation means, through a digital-analogue converter and possibly the power amplifier 720, based on dynamic models of the mechanical behaviour memorised in the computer 710.

The control device may also comprise a power amplifier 720.

Figure 10:
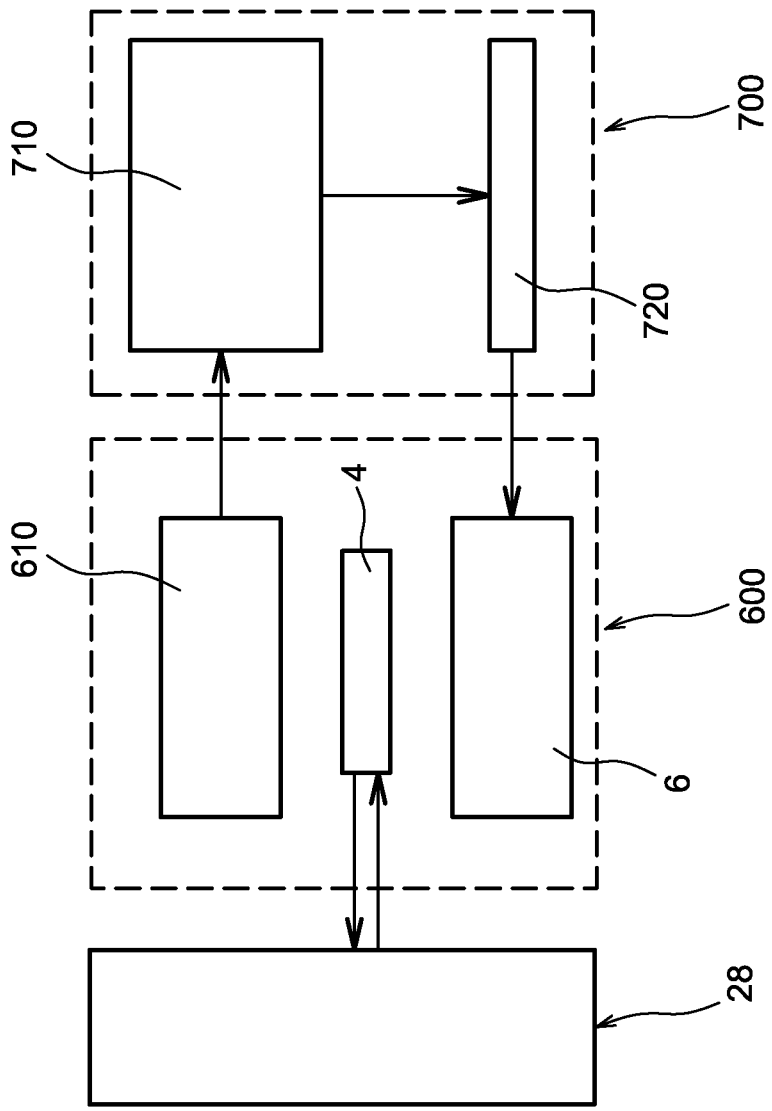
FIG. 10 shows a diagrammatic representation of a damping system operating in real time.

We will now give a general description of the operation of the damping system according to this invention with reference to the diagram in FIG. 10.

As the manual operating device 28 is actuated, the blade 4 moves along the Y axis, the sensor 610 then measures the variation with time of at least one physical magnitude characteristic of this displacement, the measured time-dependent flux is transmitted to the computer 710 of the control device 700. The control device determines the time history of current intensity values that it sends to the magnetic field generation means of the simulator 600, possibly through the power amplifier 720, in real time. The apparent viscosity of the magneto-rheological fluid then varies during actuation, the blade shears the magneto-rheological fluid and a reaction is then transmitted to the operating device through the blade 4.

The presence of slits allows particle chains to pass through the blade. To move, the blade must cut the chains by shearing which makes the resistance to displacement higher than it would be for a smooth blade.

Figure 8:
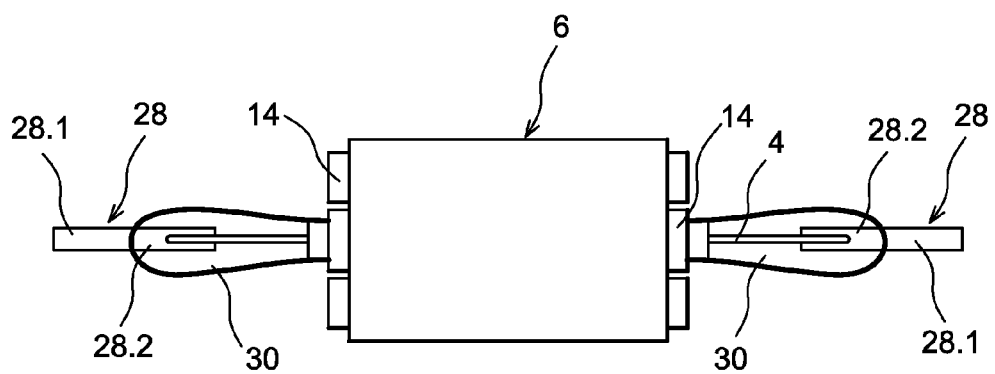
FIG. 8 is a top view of another embodiment of a damping device according to the invention.

FIG. 8 shows another embodiment of a damping device according to this invention.

According to this second embodiment, the blade slides along its longitudinal axis Y, the device then only comprises a single means of generating the magnetic field 6.

The device comprises an airgap extending over the entire length of the device, the airgap being provided with two open longitudinal ends, the blade 4 passing through the device from one side to the other, and partly through the two longitudinal open ends of the airgap.

In the example shown, the blade comprises a device 28 at each of its ends, one end of a membrane 30 being trapped by the blade in the same way as for the first embodiment, and the other end being trapped around the open ends of the airgap, thus providing a sealed confinement.

The structure of the magnetic field generation means may be identical to the structure of the means 6.1, 6.2 in the first embodiment and therefore will not be described in detail.

The mobile element may comprise more than one blade and it may be formed from several blades arranged in parallel.

To achieve this, the airgap is designed such that it comprises a plurality of parallel passages, each of which contains a blade of the mobile element.

Figure 9:
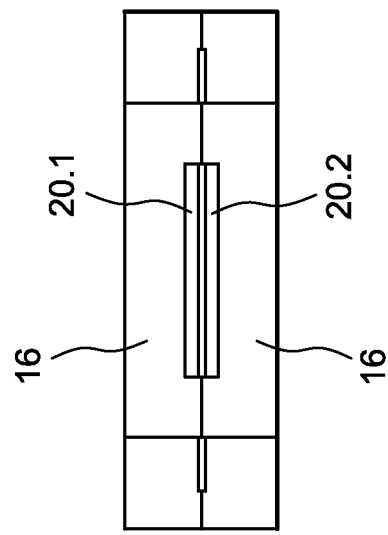
FIG. 9 shows perspective side views of a particular assembly in which two blades can be used.
Figure 9:
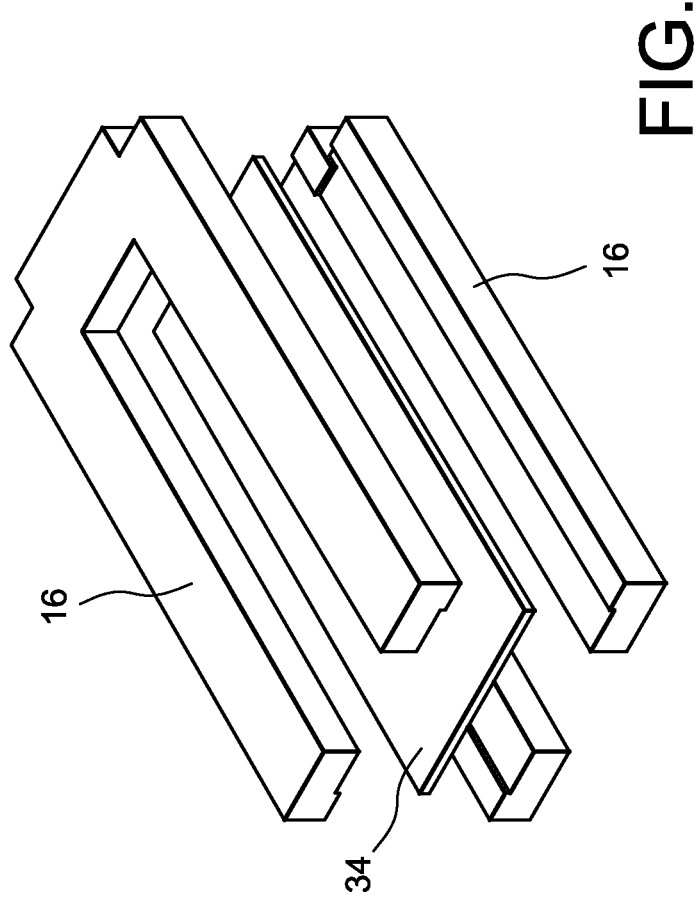

FIG. 9 shows an example embodiment of such a partition of the airgap.

In this example, a magnetic plate 34 is inserted between the U-shaped parts 16, dividing the passage 20 into two passages 20.1, 20.2 with the same dimensions, each of which can contain a blade.

The U-shaped parts may for example include milling, i.e. a slight removal of material for example equal to half of the thickness of the blade 34 on their facing faces, so that a fixed blade 34 can be inserted and held in position to maintain the seal.

The magnetic blade is isolated from the poles by the U-shaped parts 16.

The plate 34 is advantageously magnetic, such that the behaviour between the fluid and this plate is exactly the same as the behaviour between the fluid and the magnetic poles.

The configuration shown in FIG. 9 can divide the airgap into two distinct airgaps, and a non-magnetic blade can slide in each airgap. Thus, the useful shear area is doubled without increasing the total size of the device nor the electricity consumption. Therefore, the resulting damping force is increased.

The device may therefore comprise a mobile element formed from a plurality of blades intersecting a U-shaped part between each pair of magnetic blades.

The blades shown in FIGS. 2A to 4 are particularly suitable for making this mobile element with several blades.

In one variant embodiment, it would be possible to replace the traditional coils by coils on thin layers, for example PCB (Printed Circuit Board) type or silicon layers that would further reduce the total size of the system.

This invention is capable of keeping low forces at no load while providing high damping levels due to the action of the magneto-rheological fluid in shear and/or the presence of relief.

Guidance is useless when the blade is made of a non-magnetic material, because any contact with the poles does not modify the behaviour of the system. The lack of guidance makes the device simpler and easier to miniaturise.

Obviously, a mobile element with several parallel blades could be used in the device shown in FIG. 7.

Obviously, the manual operating device 28 acting as an interface with the external environment could be more complex than that described above, and in particular it could be made in several parts, for example it could form part of a connecting rod type mechanism or any other type of complex mechanical system.

Furthermore, particular embodiments of the magnetic field generation means are only given as examples and are in no way limitative, and can be modified while remaining within the scope of this invention.

The invention claimed is:

1. Damping device to oppose a reaction to a displacement of a manual operating device, said damping device comprising:
   at least one chamber containing a magneto-rheological fluid,
   two means of generating a variable magnetic field in the magneto-rheological fluid so as to modify its apparent viscosity,
   at least one element free to move in translation capable of shearing the magneto-rheological fluid and designed to be mechanically connected to the manual operating device,
   said element comprising at least one blade with a longitudinal axis comprising holes and/or recesses and/or projections,
   the two magnetic field generation means each defining an airgap forming two chambers full of magneto-rheological fluid, said airgaps being provided with a single entrance at one longitudinal end, the two magnetic field generation means being arranged at a distance from each other and such that the entrances to the airgaps are facing each other and that a longitudinal end of the blade fits into each of the airgaps, the blade moving along its axis.

2. Damping device according to claim 1, in which the blade comprises parallel slits.

3. Damping device according to claim 2, in which the slits are orthogonal to a direction of movement of the blade.

4. Damping device according to claim 1, in which the blade is made of non-magnetic material.

5. Damping device according to claim 1, in which the blade comprises:
   a core made of magnetic material in which holes are formed, and
   strips made of a non-magnetic material on its side ends and on its two faces.

6. Damping device according to claim 1, in which the blade comprises:
   a core made of magnetic material in which recesses are formed, and
   strips made of a non-magnetic material on its side ends and on its two faces.

7. Damping device according to claim 1, in which the blade comprises:
   a core made of magnetic material in which projections are formed, and
   strips made of a non-magnetic material on its side ends and on its two faces.

8. Damping device according to claim 1, in which the blade comprises:
   a solid core made of a magnetic or non-magnetic material, and
   two plates made of non-magnetic material covering each face of the solid core, slits being formed in the two plates.

9. Damping device according to claim 1, in which the mobile element comprises several parallel blades.

10. Damping device according to claim 1, comprising a flexible membrane surrounding the entrances and the operating device making a sealed assembly, the manual operating device being fixed approximately at the centre of the blade orthogonal to its longitudinal axis.

11. Damping device according to claim 10, in which the operating device is made in two parts, one part fixed on the blade and another part fixed on the part fixed on the blade, the membrane (30) being trapped between the two parts (28.1, 28.2).

12. Damping device according to claim 1, in which the mobile element comprises several parallel blades and in which the at least one airgap is divided by means of magnetic plates such that there is one airgap for each blade, one blade being used in each airgap.

13. Damping system comprising:
a damping device according to claim 1,
an electrical power supply source for the magnetic field generation means,
at least one sensor of a kinematic and/or dynamic magnitude representing the movement of this element or the operating device and an control device, said sensor being connected to the control device itself connected to the magnetic field generation means, the assembly being such that the apparent viscosity of the magneto-rheological fluid varies during displacement of the manual operating device.

14. Haptic type interface simulation system comprising a system according to claim 13.

15. Damping system according to claim 11, in which the at least one sensor is a displacement, velocity and/or acceleration sensor.

16. Haptic type interface simulation system comprising a system according to claim 15.

* * * * *

UNITED STATES PATENT AND TRADEMARK OFFICE
CERTIFICATE OF CORRECTION

| | |
|---|---|
| PATENT NO. | : 8,547,191 B2 |
| APPLICATION NO. | : 12/681651 |
| DATED | : October 1, 2013 |
| INVENTOR(S) | : Xavier Boutillon et al. |

It is certified that error appears in the above-identified patent and that said Letters Patent is hereby corrected as shown below:

On the Title page, column 1, under (75) Inventors, please replace "Lozada Massay" with
-- Lozada Massy --

In the Claims

Column 10, line 1, please replace "the" with -- a --

Signed and Sealed this
Thirty-first Day of December, 2013

Margaret A. Focarino
*Commissioner for Patents of the United States Patent and Trademark Office*

UNITED STATES PATENT AND TRADEMARK OFFICE
CERTIFICATE OF CORRECTION

PATENT NO.        : 8,547,191 B2                                          Page 1 of 1
APPLICATION NO. : 12/681651
DATED             : October 1, 2013
INVENTOR(S)       : Boutillon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 840 days.

Signed and Sealed this
Fifteenth Day of September, 2015

Michelle K. Lee
*Director of the United States Patent and Trademark Office*